United States Patent [19]

Nottmeyer

[11] Patent Number: 5,415,040
[45] Date of Patent: May 16, 1995

[54] ACCELERATION SENSOR
[75] Inventor: Kay Nottmeyer, Saitama, Japan
[73] Assignee: Zexel Corporation, Tokyo, Japan
[21] Appl. No.: 197,269
[22] Filed: Feb. 16, 1994
[30] Foreign Application Priority Data
  Mar. 3, 1993 [JP] Japan ................... 5-065919
[51] Int. Cl.⁶ ............................................. G01P 15/08
[52] U.S. Cl. .................................................. 73/517 R
[58] Field of Search ........... 73/517 R, 517 B, 517 AV
[56] References Cited
  U.S. PATENT DOCUMENTS
  4,699,006 10/1987 Boxenhorn .................... 73/517 AV
  FOREIGN PATENT DOCUMENTS
  497289A1 8/1992 European Pat. Off. .
  4-130277 4/1992 Japan .

Primary Examiner—Hezron E. Williams
Assistant Examiner—Christine K. Oda

[57] ABSTRACT

An disclosed an acceleration sensor for detecting three accelerations includes acceleration in a direction of a Z axis and angular accelerations about X and Y axes. The sensor includes an inner support, a ring-shaped weight surrounding the inner support, and an outer support surrounding the weight, all disposed in a plane including the X and Y axes which are perpendicular to each other. The weight includes four objective parts for detection which are arranged in the above-mentioned plane. The objective parts are located in line symmetry with respect to the X and Y axes and arranged at intervals of 90° about the center of gravity of the weight. The inner support and the weight are connected together by a thin and elastically deformable first bridge. The weight and the outer support are also connected together by a second bridge of a similar configuration. These bridges each include a ring portion, a pair of inner connecting portions and a pair of outer connecting portions. The inner connecting portions and the outer connecting portions are away by 90° from each other about the Z axis. Amounts of displacement of the four objective parts on the weight in a direction of the Z axis are detected by condensers, respectively.

8 Claims, 4 Drawing Sheets

ACCELERATION SENSOR

BACKGROUND OF THE INVENTION

This invention relates to an acceleration sensor capable of detecting accelerations with respect to a plurality of axes.

A semiconductor acceleration sensor is an example of such an acceleration sensor. As disclosed, for example, in Japanese Laid-Open Patent Application No. Hei 4-130277, this semiconductor acceleration sensor is formed by etching a silicon substrate and includes a weight, a rectangular support surrounding this weight, and flexible and elastically deformable thin bridges for connecting the support and the weight together. The support, the weight and the bridges are integrally formed. The weight is connected at opposite ends thereof (in the direction of an X axis) to the supports through one or two pairs bridges. A pair of movable electrodes are formed on opposite surfaces of the weight in the sense of a direction of a Z axis. Disposed opposite the pair of movable electrodes are a pair of stationary electrodes. These movable electrodes and stationary electrodes constitute a pair of condensers. In this acceleration sensor, the weight is displaced in the direction of the Z axis when an acceleration is acted in the direction of the Z axis, and the bridges are expanded by elastic deformation thereof. The capacity variations of the condensers at that time indicate the direction and amount of the acceleration in the Z axis. However, this acceleration sensor is capable of detecting only the acceleration in a direction of one axis, i.e., Z axis.

A semiconductor acceleration sensor disclosed in FIGS. 1 to 6 of European Patent No. 497289 comprises a weight of a rectangular configuration, a rectangular support surrounding the weight, and a pair of bridges for connecting central parts of longitudinal opposite sides of the weight to the support. The pair of bridges are thin, flexible, and elastically deformable. In this embodiment, when an angular acceleration is applied in the sense of an X axis passing the pair of bridges, the weight is rotationally displaced about the X axis and the bridges are twisted in response to the rotational motion of the weight. The weight is stopped at a location where an elastic force corresponding to the twisting amount of the bridges and a force accompanying the angular acceleration are balanced. Accordingly, the angular acceleration can be detected by detecting an amount of the rotational displacement of the weight. Means for detecting the amount of the rotational displacement of the weight comprises four condensers. Specifically, opposite end portions of the weight in the longitudinal direction (Y axis) are provided with movable electrodes formed on opposite surfaces thereof in the direction of the Z axis. By placing stationary electrodes opposite these four movable electrodes, the four condensers are formed. In this acceleration sensor, however, only an angular acceleration about one axis, i.e., X axis, can be detected.

FIGS. 7 to 12 of the European Patent disclose a sensor capable of detecting angular accelerations about an X axis and a Y axis. This sensor comprises an inner weight having a rectangular configuration, an outer weight surrounding the inner weight, and a support surrounding the outer weight. The outer weight is supported by the support through a pair of bridges disposed on the Y axis, while the inner weight is disposed on the outer weight through a pair of bridges disposed on the X axis. The inner weight is rotationally displaced about the X axis, while the outer weight is rotationally displaced about the Y axis. This acceleration sensor is capable of detecting angular accelerations about two axes, i.e., X and Y axes, but incapable of detecting an acceleration in a Z axis.

SUMMARY OF THE INVENTION

The present invention provides an acceleration sensor capable of detecting three accelerations, i.e., angular accelerations about the X and Y axes, and an acceleration in a direction of the Z axis.

According to the present invention, there is essentially provided an acceleration sensor comprising:

(a) a first component element and a second component element arranged in a plane including an X axis and a Y axis which are perpendicular to each other, the second component element surrounding the first component element through a space, one of the first and second component elements being provided as a support and the other being provided as a weight, the weight having four objective parts for detection which are arranged in the plane, the objective parts being located in line symmetry with respect to the X and Y axes and arranged at intervals of 90° about the center of gravity of the weight;

(b) an elastically deformable thin bridge for connecting the first component element and the second component element together, the bridge including a ring portion, a pair of inner connecting portions and a pair of outer connecting portions, the ring portion being disposed in the space formed between the first component element and the second component element, the pair of inner connecting portions being adapted to connect the ring portion to the first component element and disposed on one of the X and Y axes in such a manner as to be opposite to each other with the center of gravity of the weight located therebetween, the pair of outer connecting portions being adapted to connect the ring portion to the second component element and disposed on the other axis in such a manner as to be opposite to each other with the center of gravity of the weight located therebetween; and (c) four detection means for detecting amounts of displacement of the four objective parts in a direction of a Z axis which is perpendicular to the X and Y axes, respectively.

DETAILED DESCRIPTION OF THE INVENTION

Figure 1:
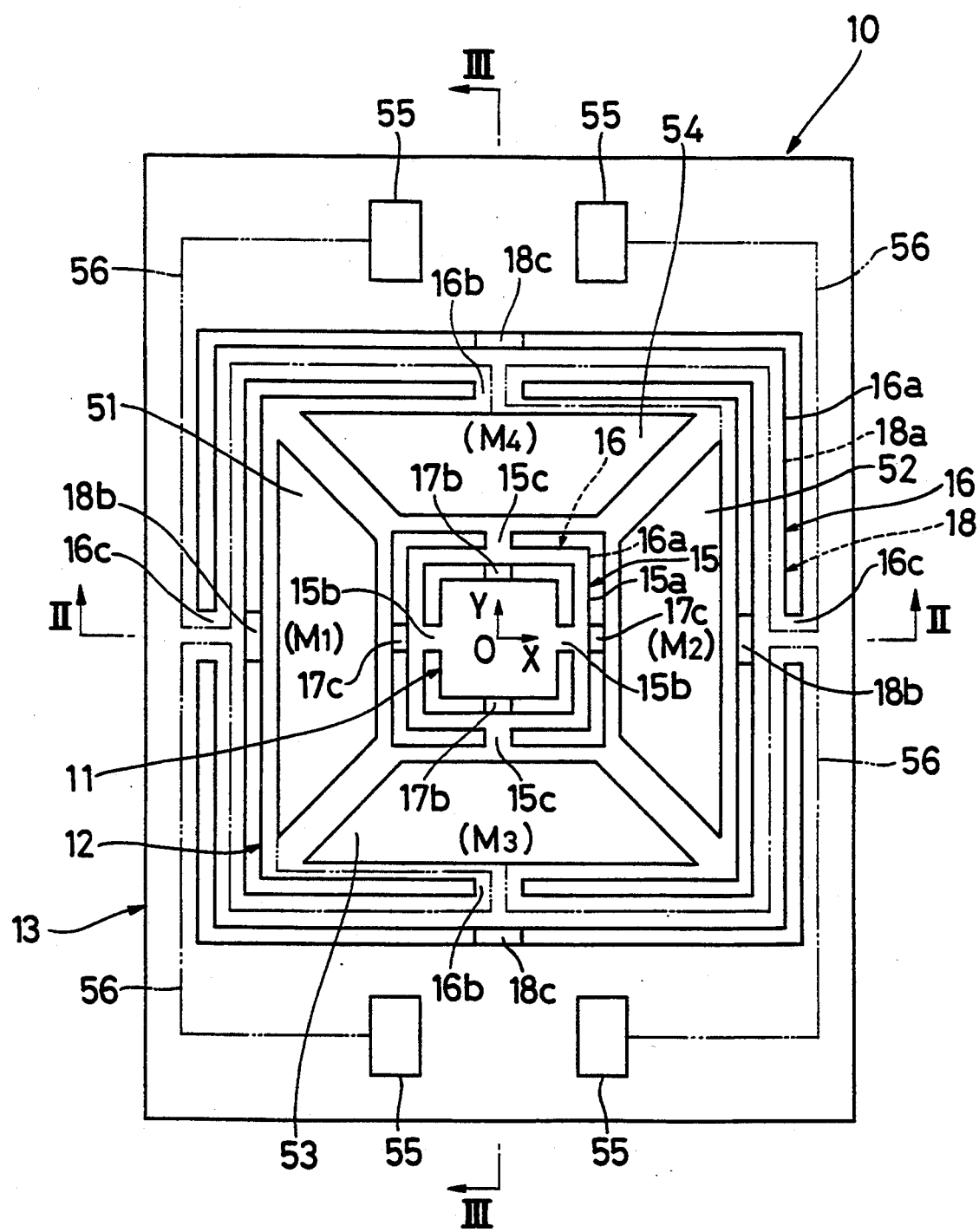
FIG. 1 is a plan view showing an acceleration sensor according to the present invention but with an upper cover omitted.
Figure 2:
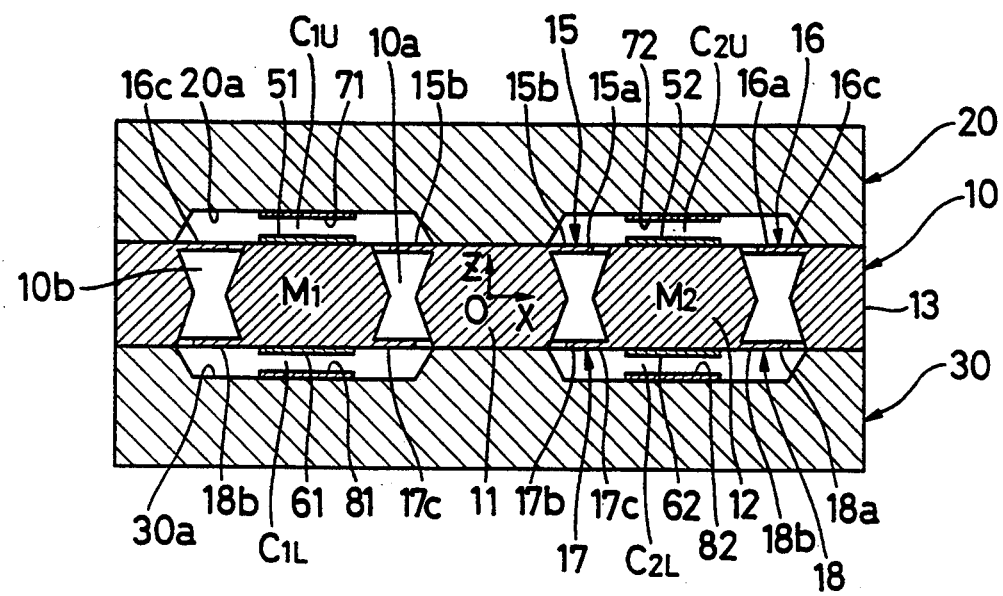
FIG. 2 is a cross-sectional view taken along line II—II of FIG. 1.
Figure 3:
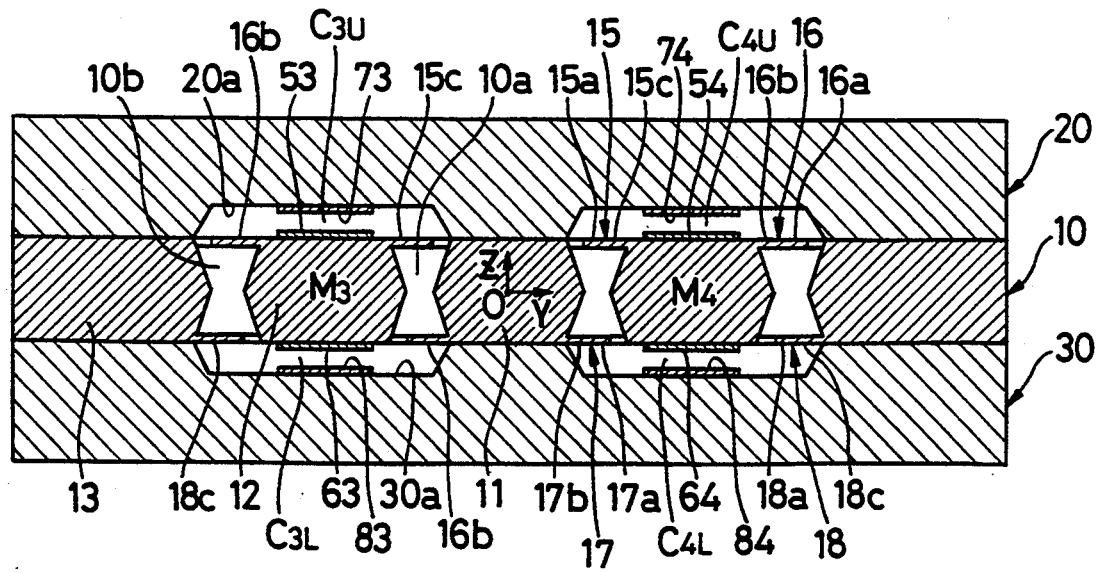
FIG. 3 is a cross-sectional view taken on line III—III of FIG. 1.

The present invention will be described hereinafter with reference to the accompanying drawings. Referring first to FIGS. 1 to 3, a construction of an acceleration sensor will be described. Here, the definitions are given on three axes, i.e., an X axis, a Y axis and a Z axis, which are convenient for explaining the construction of the acceleration sensor. These X, Y, and Z axes extend passing through the center of gravity 0 of a weight 12 as later described in perpendicular relation to one another.

As shown in FIGS. 2 and 3, the acceleration sensor includes three layers arranged in a direction of the Z axis. The central layer is a base 10 made of silicon, and the upper and lower layers are covers 20 and 30 formed of a glass plate, respectively.

The base 10 has a line symmetrical construction with respect to the X and Y axes. Specifically, as shown in FIG. 1, the base 10 comprises an inner support 11, a weight 12 surrounding this inner support 11 through a space 10a, and an outer support 13 surrounding this weight 12 through a space 10b, all in a plane including the X and Y axes. The inner support 11 has a regular square planar configuration. The weight 12 is a ring-shaped regular square configuration. The outer support 13 has a regular square inner periphery and a rectangular outer periphery.

The inner support 11 and the weight 12 are connected together through a first bridge 15 and a third bridge 17. The bridges 15 and 17 have the same configurations and formed into sheets of film or thin plates, respectively. As shown in FIGS. 2 and 3, the first and third bridges 15 and 17 are away from each other in a direction of a Z axis. The first bridge 15 has an upper surface flush with upper surfaces of the supports 11 and 13 and weight 12, while the third bridge 17 has a lower surface flush with lower surfaces of the supports 11 and 13 and weight 12.

The first bridge 15 includes a ring portion 15a having a square planar configuration, a pair of inner connecting portions 15b, and a pair of outer connecting portions 15c. Similarly, the third bridge 17 includes a ring portion 17a, a pair of inner connecting portions 17b, and a pair of outer connecting portions 17c.

The ring portions 15a and 17a of the first and third bridges 15 and 17 are disposed in the space 10a formed between the inner support 11 and the weight 12. In FIG. 1, the ring portion 17a of the third bridge 17 is hidden by the ring portion 15a of the first bridge 15 and therefore not seen.

The pair of inner connecting portions 15b of the first bridge 15 are adapted to connect the ring portion 15a to the inner support 11. Specifically, as shown in FIG. 1, the pair of inner connecting portions 15b are disposed on the X axis and adapted to connect central portions of two sides, these two sides being perpendicular to the X axis, out of four sides of the inner support 11 to central portions of two sides, these two sides being perpendicular to the X axis, out of four sides of the inner periphery of the ring portion 15a, respectively. The pair of inner connecting portions 15b are placed opposite to each other with the center of gravity 0 located therebetween.

The pair of outer connecting portions 15c of the first bridge 15 to connect the ring portion 15a to the weight 12. Specifically, as shown in FIG. 1, the pair of outer connecting portions 15c are disposed on the Y axis and adapted to connect central portions of two sides, these two sides being perpendicular to the Y axis, out of four sides of the outer periphery of the ring portion 15a respectively to central portions of two sides which are perpendicular to the Y axis at the inner periphery of the weight 12. The pair of outer connecting portions 15c are placed opposite to each other with the center of gravity 0 located therebetween. It is important hat the outer connecting portion 15c is away by 90° from the inner connecting portion 15b about the Z axis and therefore, the ring portion 15a is elastically deformable depending on the amount of acceleration acted on the acceleration sensor as later described.

As shown in FIG. 1, the pair of inner connecting portions 17b of the third bridge 17 are away by 90° from the inner connecting portions 15b of the first bridge 15 about the Z axis. In other words, the pair of inner connecting portions 17b are disposed on the Y axis and connect central portions of two sides, which are perpendicular to the Y axis, of the inner support 11 respectively to central portions of two sides which are perpendicular to the Y axis at the inner periphery of the ring portion 17a.

Similarly, the pair of outer connecting portions 17c of the third bridge 17 are away by 90° from the outer connecting portions 15c of the first bridge 15. In other words, the pair of outer connecting portions 17b are disposed on the X axis and adapted to connect central portions of two sides which are perpendicular to the X axis at the outer periphery of the ring portion 17a respectively to central portions of two sides which are perpendicular to the X axis at the inner periphery of the weight 12.

The thicknesses of the respective portions 15b, 15c, 17b and 17c are the same to those of the ring portion 15a and 17a, and the widths of the former are all equal but wider than those of the ring portions 15a and 17a.

The weight 12 and the outer support 13 are connected together through a second bridge 16 and a fourth bridge 18. The bridges 16 and 18 have the same configurations and formed into sheets of film or thin plates, respectively. As shown in FIGS. 2 and 3, the second and fourth bridges 16 and 18 are away from each other in a direction of the Z axis. The second bridge 16 has an upper surface flush with upper surfaces of the weight 12 and supports 11 and 13, while the fourth bridge 18 has a lower surface flush with lower surfaces of the weight 12 and supports 11 and 13.

The second and fourth bridges 16 and 18 are similar in basic construction to the first and third bridges but larger in planar configuration than them. Specifically, the second bridge 16 includes a ring portion 16a having a square planar configuration, a pair of inner connecting portions 16b and a pair of outer connecting portions 16c. Similarly, the fourth bridge 18 also includes a ring portion 18a, a pair of inner connecting portions 18b and a pair of outer connecting portions 18c. The ring portions 16a and 18a of the second and fourth bridges 16 and 18 are disposed in the space 10b formed between the weight 12 and the outer support 13.

The pair of inner connecting portions 16b of the second bridge 16 to connect the ring portion 16a to the weight 12. Specifically, as shown in FIG. 1, the pair of inner connecting portions 16b are disposed on the Y axis and adapted to connect central portions of two sides which are perpendicular to the Y axis at the outer periphery of the weight 12 respectively to central portions of two sides which are perpendicular to the Y axis at the inner periphery of the ring portion 16a.

The pair of outer connecting portions 16a of the second bridge 16 to connect the ring portion 16a to the outer support 13. Specifically, the pair of outer connecting portions 15c are disposed on the X axis and connect central portions of two sides which are perpendicular to the X axis at the outer periphery of the ring portion 16a respectively to central portions of two sides which are perpendicular to the X axis at the inner periphery of the outer support 13.

The pair of inner connecting portions 18b of the fourth bridge 18 are disposed on the X axis and connect central portions of two sides which are perpendicular to the X axis at the outer periphery of the weight 12 respectively to central portions of two sides which are perpendicular to the X axis at the inner periphery of the ring portion 18a.

The pair of outer connecting portions 18c of the fourth bridge 18 are disposed on the Y axis and to connect central portions of two sides which are perpendicular to the Y axis at the outer periphery of the ring portion 18a respectively to central portions of two sides which are perpendicular to the Y axis at the inner periphery of the outer support 13.

As apparent from the above description, the inner connecting portions 16b and the outer connecting portions 16c of the second bridge 16 are away by 90° from the inner connecting portions 15b and the outer connecting portions 15c of the first bridge portion 15 about the Z axis, respectively, and are in the same angular positions as the inner connecting portions 17b and the outer connecting portions 17c of the third bridge 17, respectively. Similarly, the inner connecting portions 18b and the outer connecting portions 18c of the fourth bridge 16 are away by 90° from the inner connecting portions 16b and the outer connecting portions 16c of the second bridge portion 16 about the Z axis, respectively, and are in the same angular positions as the inner connecting portions 15b and the outer connecting portions 15c of the first bridge 15, respectively.

The thicknesses of the respective portions 16b, 16c, 18b and 18c are the same to those of the ring portions 16a and 18a, and the widths of the former are all equal but wider than those of the ring portions 16a and 18a.

The bridges 15 to 18 are dimensioned such that they are comparatively easily elastically deformed by twist force and by bend force but hardly elastically deformed by tensile force. In this embodiment, the thicknesses of the bridges 15 to 18 are all 0.01 mm. The ring portions 15a and 17a of the first and third bridges 15 and 17 are 1 mm in length of one outer side and 0.09 mm in width. Likewise, the ring portions 16a and 18a of the second and fourth bridges 16 and 18 are 3.1 mm in length of one outer side and 0.17 mm in width.

The base 10 is made by etching a silicon substrate. All component parts of the base 10, that is, supports 11 and 13, weight 12 and bridges 15 to 18, are integral.

The weight 12 has four objective parts M1 to M4 for detection in a plane including the X and Y axes. The objective parts M1 and M2 are disposed on the X axis as opposite each other with the center of gravity 0 located therebetween. The objective parts M3 and M4 are disposed on the Y axis as to be opposite each other with the center of gravity 0 located therebetween.

Four electrodes 51 to 54 are formed on upper surfaces of the objective parts M1 to M4 by suitable means such as plating or vapor deposition. Similarly, four electrodes 61 to 64 are formed on lower surfaces of the objective parts M1 to M4. The electrodes 51 to 54 and 61 to 64 are all of the same configurations. These electrodes 51 to 54 and 61 to 64 define the planar configurations of the objective parts M1 to M4.

A generally square and annular recess 20a is formed in that portion of a lower surface of the upper cover 20 opposite to the weight 12, so that the weight 12 may be displaced. Four stationary electrodes 71 to 74 are formed on a bottom surface of the recess 20a by suitable means such as plating or vapor deposition. The respective stationary electrodes 71 to 74 have the same configurations as the electrodes 51 to 54 and placed opposite each other, thereby comprising condensers $C_{1u}$, $C_{2u}$, $C_{3u}$ and $C_{4u}$.

A regular square annular recess 30a is also formed in that portion of an upper surface of the lower cover 30 opposite to the weight 12 so that the weight 12 may be displaced. Four stationary electrodes 81 to 84 are formed on the bottom surface of the recess 30a. The respective stationary electrodes 81 to 84 have the same configurations as the electrodes 61 to 64 and placed opposite to each other, thereby comprising condensers $C_{1L}$, $C_{2L}$, $C_{3L}$ and $C_4$. Electrostatic capacities of the condensers $C_{1u}$ to $C_{4u}$ and $C_{1L}$ to $C_{1L}$ are all equal when the acceleration is not acted.

The electrodes 51 to 54 are connected to four terminals 55 through leads 56 formed on the upper surfaces of the weight 12, the second bridge 16 and the outer support 13. The terminals 55 and the leads 56 are formed by suitable means such as plating or vapor deposition. The electrodes 61 to 64 are likewise connected respectively four terminals (not shown) disposed on the lower surface of the outer support 13.

Although not illustrated, the covers 20 and 30 are provided respectively with four through-holes having electrically conductive layers on inner peripheral surfaces thereof and extending in the direction of the Z axis. One ends of the through-holes are connected respectively to the electrodes 71 to 74 and 81 to 84, while the other ends are connected to terminals which are formed four each on the outer surfaces of the covers 20 and 30.

The terminals 55 formed on the upper and lower surfaces of the base 10 are also connected respectively to terminals which are formed four each on the outer surfaces of the covers 20 and 30 through other through-holes in the covers 20 and 30.

A total number of sixteen terminals formed on the outer surfaces of the covers 20 and 30 are served as connecting terminals of four differential bridge circuits.

Figure 8:
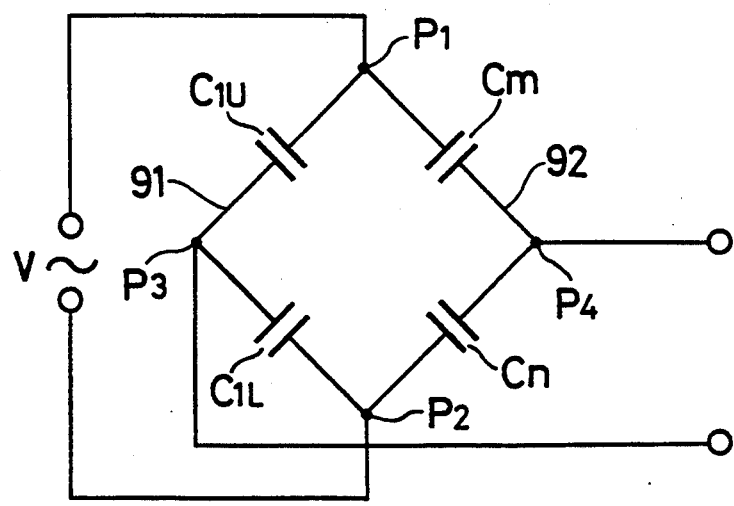
FIG. 8 is a diagram showing a differential bridge circuit suitable for detecting the variations of the capacity of a pair of condensers of the acceleration sensor.

FIG. 8 shows the differential bridge circuit for detecting an amount of displacement of the objective part M1 on the weight 12 in the direction of the Z axis. Specifically, in the differential circuits, serial circuits 91 of the condensers $C_{1u}$ and $C_{1L}$ and serial circuits 92 of the stationary condensers Cm and Cn are connected in parallel to a high frequency power source V. A high frequency voltage is applied between connecting points $P_1$ and $P_2$ for connecting the serial circuits 91 and the serial circuits 92, respectively. Here, the electrostatic capacities of the stationary condensers Cm and Cn are equal to each other and also equal to the electrostatic capacities of the condensers $C_{1u}$ and $C_{1L}$ when the acceleration is not acted. A voltage (output voltage of the differential bridge circuit) between a connecting point $P_3$ for connecting the condensers $C_{1u}$ and $C_{1L}$ and a connecting point $P_4$ for connecting the condensers Cm and Cn indicates an amount and direction of displacement in the direction of the Z axis of the objective part M1.

Similarly, the amounts of displacement in the direction of the objective parts M2 to M4 are detected respectively by the differential bridge circuit in which the condensers $C_{2u}$ and $C_{2L}$ is built, the differential bridge circuit in which the condensers $C_{3u}$ and $C_{3L}$ are built, and the differential bridge circuit in which the condensers $C_{4u}$ and $C_{4L}$ are built.

The output voltages from the four differential bridges are sent to a microcomputer, for example, through an amplifying circuit, a synchronous rectifying/smoothing circuit, an analog/digital converter, etc.

Figure 4:
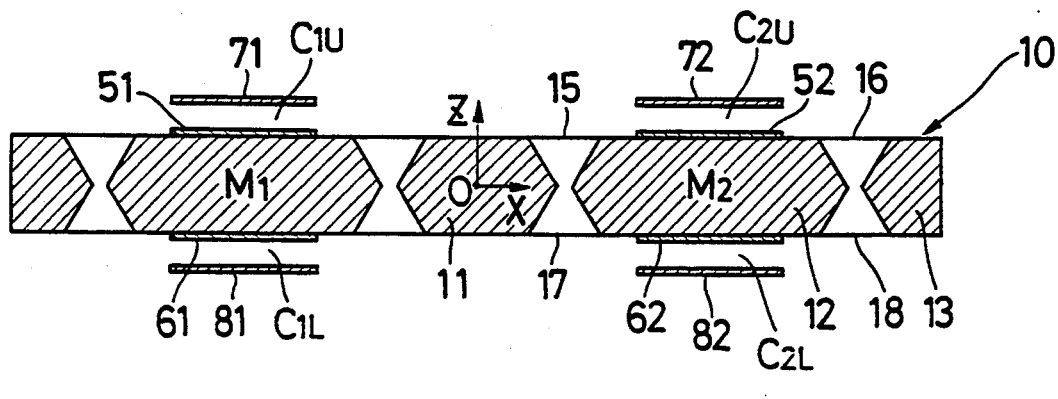
FIG. 4 is a schematic cross-sectional view of the acceleration sensor when the acceleration is not given.

Operation of the acceleration sensor thus constructed will now be described with reference to FIGS. 4 to 6. FIG. 4 shows a state in which the acceleration is not acted. When the acceleration is acted in a direction parallel to the plane including the X and Y axes, the bridges 15 to 18 are hardly deformed and the weight 12 is hardly moved in the horizontal direction. Accordingly, the acceleration sensor is maintained the condition of FIG. 4.

Figure 5:
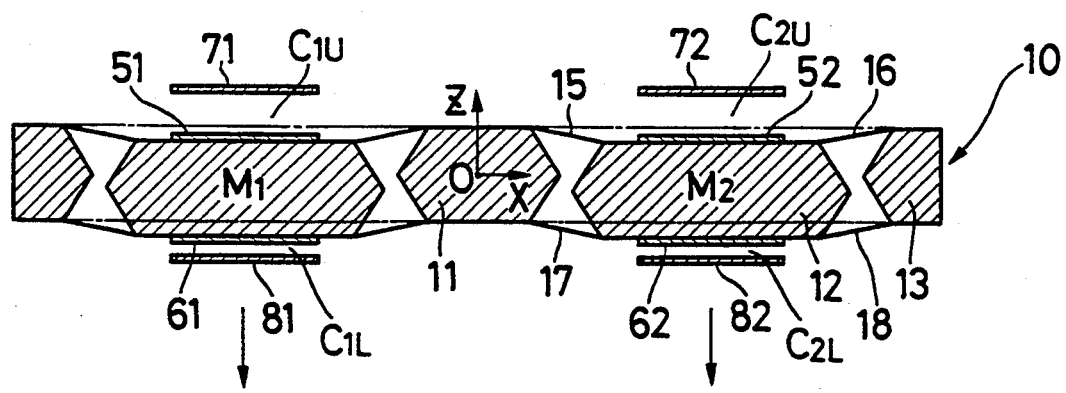
FIG. 5 is a schematic cross-sectional view, similar to FIG. 4, of the acceleration sensor but in which the acceleration is given in a direction of a Z axis.
Figure 6:
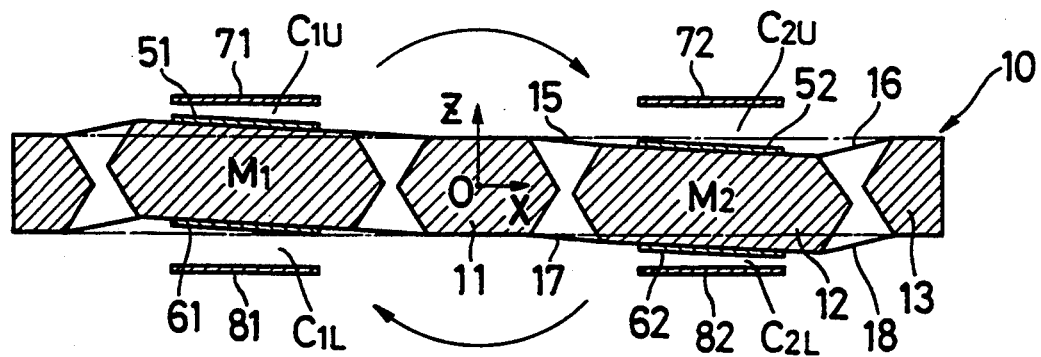
FIG. 6 is a schematic cross-sectional view, similar to FIG. 4, of the acceleration sensor but in which the angular acceleration is given about a Y axis.

As shown in FIG. 5, in case the acceleration directing downwardly in the direction of the Z axis is acted on the acceleration sensor, the weight 12 is moved in the direction of the Z axis while maintaining a posture parallel to the X and Y axes. In response to this movement, those portions of the bridges 15 and 18 connected to the weight 12, that is, the outer connecting portions 15c and 17c of the first and third bridges 15 and 17 and the inner connecting portions 16b and 18b of the second and fourth bridges 16 and 18 are moved together with the weight 12. At that time, those portions connected to the supports 11 and 13, that is, the inner connecting portions 15b and 17b of the first and third bridges 15 and 17 and the outer connecting portions 16c and 18c of the second and fourth bridges 16 and 18 are not positionally displaced.

Figure 7:
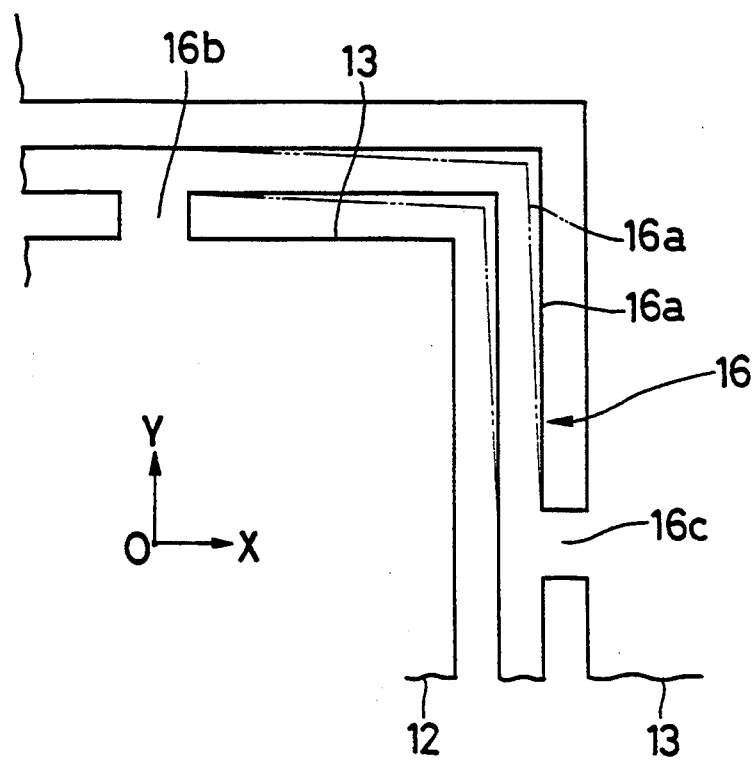
FIG. 7 is a partly enlarged plan view showing how bridges are deformed when the acceleration is given in a direction of the Z axis.

When the weight 12 is displaced in the direction of the Z axis, the connecting portions 15b, 15c, 16b, 16c, 17b, 17c, 18b and 18c of the bridges 15 to 18 are bend-deformed and the ring portions 15a to 18a are twist-deformed and bend-deformed. This will be described further by way of the example of the second bridge 16. As shown in FIG. 7, as the inner connecting portion 16b of the second bridge 16 is moved in the direction of the Z axis, the ring portion 16a of the second bridge 16 is twist-deformed and bend-deformed such that its corner portion is displaced inwardly as indicated by an imaginary line. The same is true to the remaining bridges 15, 17 and 18. When an elastic force generated by the elastic deformation of the bridges 15 to 18 is balanced with the acting force generated by the acceleration, the weight 12 is stopped. In other words, while elastically deforming the bridges 15 to 18, the weight 12 is displaced a distance corresponding to the amount of the acceleration acted on the weight 12. At this time, the amounts of displacement of the objective parts M1 to M4 on the weight 12 in the direction of the Z axis are the same. The distances between the movable electrodes 51 to 54 and the stationary electrodes 71 to 74 are increased respectively and the distances between the movable electrodes 61 to 64 and the stationary electrodes 81 to 84 are decreased. As a result, the electrostatic capacities of the upper condensers $C_{1u}$ to $C_{4u}$ are reduced, while the electrostatic capacities of the lower condensers $C_{1L}$ to $C_{4L}$ are increased, respectively. In the microcomputer, there can be distinguished a condition in which only the acceleration directing in the direction of the Z axis is acted, based on the fact that the outputs of the four differential bridge circuits are all equal. Also, there can be detected the direction and amount of the acceleration with reference to the outputs of the differential bridge circuits. In case the angular acceleration about the Y axis is acted on the weight 12, the weight 12 is rotationally displaced about the Y axis as shown in FIG. 6. In response to this rotational displacement, the bridges 15 to 18 are twist-deformed and bend-deformed. In this case, since electrostatic capacity of the condenser $C_{1u}$ is increased and the electrostatic capacity of the condenser $C_{1L}$ is decreased, the output from the differential bridge circuits including the condensers $C_{1u}$ and $C_{1L}$, indicates the upward displacement of the objective part M1 on the weight 12. Also, since the electrostatic capacity of the condenser $C_{2u}$ is reduced and the electrostatic capacity of the condenser $C_{2L}$ is increased, the output from the differential bridge circuits including the condensers $C_{2u}$ and $C_{1L}$, indicates the same amount of downward displacement of the objective part M2 on the weight 12. Since there are no changes in electrostatic capacities of the condensers $C_{3u}$, $C_{3L}$, $C_{4u}$ and $C_{4L}$, the output from the differential bridge circuit in which the condensers $C_{3u}$ and $C_{3L}$ are built and the output from the differential bridge circuit in which the condensers $C_{4u}$ and $C_{4L}$ are built, indicate that the objective parts M3 and M4 are not displaced in the direction of the Z axis respectively. As a result, the microcomputer is capable of discriminating the fact that the angular acceleration is applied only to the Y axis and also knowing the amount and direction of the angular acceleration.

In case the angular acceleration about the X axis is acted, the objective parts M3 and M4 are displaced in the opposite directions relative to each other along the Z axis but the objective parts M1 and M2 are not displaced in the direction of the Z axis. Since the remaining operation is similar to the case in which the angular acceleration about the Y axis is acted, description thereof is omitted.

The purposes of the provision of the four bridges will now be described in detail. If only the first and second bridges 15 and 16 are provided for example, the output of the differential bridge circuit having the condensers $C_{1u}$ and $C_{1L}$ built therein and the output of the differential bridge circuit having the condensers $C_{2u}$ and $C_{2L}$ built therein become different between the angular acceleration about the X axis and the angular acceleration about the Y axis even if the amounts of the acceleration are the same. The reason is that since the inner connecting portions 15b of the first bridge 15 are disposed on the X axis and the outer connecting portions 15c are disposed on the Y axis, the manner of elastic deformation of the ring portion 15a of the first bridge 15 is slightly different between the acceleration acting about the X axis and the acceleration acting about the Y axis. Similarly, since the inner connecting portions 16b of the second bridge 16 are disposed on the Y axis and the outer connecting portions 16c are disposed on the X axis, the manner of elastic deformation of the ring portion 16a of the second bridge 16 is slightly different between the acceleration acting about the X axis and the acceleration acting about the Y axis.

Since the connecting portions 17b and 17c of the third bridge 17 are displaced 90° about the Z axis relative to the connecting portions 15b and 15c of the first bridge 15, the ring portion 17a of the third bridge 17 is elastically deformed at the time the acceleration is acting about the X axis in the same manner as the ring portion 15a of the first bridge 15 being elastically deformed at the time the acceleration is acting about the Y axis, and the ring portion 17a is elastically deformed at the time the acceleration is acting about the Y axis in the same manner as the ring portion 15a of the first bridge 15 being elastically deformed at the time the acceleration is acting about the X axis.

Since the connecting portions 18b and 18c of the fourth bridge 18 are displaced 90° about the Z axis relative to the connecting portions 16b and 16c of the second bridge 16, the ring portion 18a of the fourth bridge 18 is elastically deformed at the time the acceleration is acting about the X axis in the same manner as the ring portion 16a of the second bridge 16 being elastically deformed at the time the acceleration is acting about the Y axis, and the ring portion 18a is elastically deformed at the time the acceleration is acting about the Y axis in the same manner as the ring portion 16a of the second bridge 16 being elastically deformed at the time the acceleration is acting about the X axis.

Because of the reasons mentioned above, the respective differential bridges are capable of generating the same output voltage as long as the amounts of the angular acceleration are the same, irrespective of the X and Y axis about which the acceleration is acting.

Actually, the angular acceleration about the X axis, the angular acceleration about the Y axis and the acceleration in the direction of the Z axis are acted in combination. In the microcomputer, the angular accelerations about the X and Y axes and the acceleration in the direction of the Z axis are detected in accordance with the outputs from the four differential bridge circuits.

In this embodiment, since there are provided the inner bridges 15 and 17 and the outer bridges 16 and 18, the sensibility for detecting the angular accelerations about the X and Y axes and the detection sensibility for the acceleration in the direction of the Z axis can be comparatively freely set.

Specifically, as apparent from FIG. 5, in case the weight 12 is displaced in the direction of the Z axis, the amounts of deformation of the second and fourth bridges which are located outwardly are generally equal to those of the first and third bridges 15 and 17 which are located inwardly. Accordingly, the detection sensibility for the acceleration in the direction of the Z axis depends entirely on the bridges 15 to 16. On the other hand, in case the weight 12 is rotationally displaced about the X or Y axis, the amounts of deformation of the second and fourth bridges 16 and 18 which are located outwardly are large and those of the first and second bridges 15 and 17 which are located inwardly are small. Accordingly, the detection sensibility for the angular acceleration depends greatly on the outer bridges 16 and 18, and its dependency on the inner bridges 16 and 18 is small.

Accordingly, in case the spring constants of the first and third bridges are changed for example, the detection sensibility for the acceleration in the Z direction is changed but the detection sensibility for the angular accelerations about the X and Y axes is hardly changed.

On the contrary, in case the spring constants of the second and fourth bridges 16 and 18 are changed, the detection sensibility for the angular accelerations about the X and Y axes is changed. The amount of change in detection sensibility for the acceleration in the direction of the Z axis is smaller than the amount of change in detection sensibility for the angular accelerations.

For example, if the spring constants of the second and fourth bridges 16 and 18 are set small and those of the first and third bridges 15 and 17 are set large, the detection sensibility for the angular accelerations is increased and the detection sensibility for the acceleration in the direction of the Z axis is decreased (but the range of detection is increased). The spring constants of the bridges 15 to 18 can be set in accordance with thickness, width, etc.

The present invention is not limited to the embodiments specifically described above, but various modifications can be made without departing from the spirit of the invention.

For examples, the supports 11 and 13, the weight 12 and the ring portions 15a to 18a of the bridges 15 to 18 may be circular.

Only one of the supports 11 and 13 may be connected to the weight 12 by selected one of the bridges 15 and 18.

The inner connecting portions and outer connecting portions of the bridges 15 to 18 may be arranged in the same angular position.

Furthermore, in case the stationary electrodes 61 to 64 and 81 to 84 are mutually independent, an arrangement is possible in which the four electrodes 51 to 54 of the weight 12 are replaced by a common electrode, the stationary electrodes 61 to 64 are replaced by a common electrode, and these common electrodes are grounded. Similarly, in case the electrodes 51 to 54 and 61 to 64 are mutually independent, an arrangement is possible in which the stationary electrodes 71 to 74 of the cover 20 are replaced by a common electrode, the stationary electrodes 81 to 84 of the cover 30 are replaced by a common electrode, and these common electrodes are grounded. In case the weight 12 is electrically conductive, an arrangement is possible in which no electrodes are formed on the weight 12 and the weight 12 is grounded.

The four objective parts of the weight 12 and the condensers corresponding to the objective parts may be displaced 45° from the X and Y axes.

What is claimed is:

1. An acceleration sensor comprising:
   (a) an inner support arranged in a plane including an X axis and a Y axis which are perpendicular to each other;
   (b) a ring-shaped weight surrounding said inner support through a first space, said weight having four objecting parts for detection which are arranged in said plane, said objective parts being located in line symmetry with respect to the X and Y axes and arranged at intervals of 90° about the center of gravity of said weight;
   (c) an outer support arranged in said plane, said outer support surrounding said weight through a second space;
   (d) an elastically deformable thin first bridge for connecting said inner support and said weight together, said first bridge comprising a ring portion, a pair of inner connecting portions and a pair of outer connecting portions, said ring portion being disposed in said first space, said pair of inner connecting portions connecting said ring portion to said inner support and disposed on one of the X and Y axes opposite each other with the center of gravity of said weight located therebetween, said pair of outer connecting portions connecting said ring portion to said weight and disposed on the other axis opposite each other with the center of gravity of said weight located therebetween;

(e) an elastically deformable thin second bridge for connecting said weight and said outer support together, said second bridge including a ring portion, a pair of inner connecting portions and a pair of outer connecting portions, said ring portion of said second bridge being disposed in said second space, said pair of inner connecting portions of said second bridge connecting said ring portion of said second bridge to said weight and disposed on one of the X and Y axes opposite each other with the center of gravity of said weight located therebetween, said pair of outer connecting portions connecting said ring portion of said second bridge to said outer support and disposed on the other axis in such a manner as to be opposite to each other with the center of gravity of said weight located therebetween; and (f) four detection means for detecting amounts of displacement of said four objective parts in a direction of a Z axis which is perpendicular to the X and Y axes, respectively.

2. An acceleration sensor according to claim 1, in which an outer peripheral configuration of said inner support is regular square, said weight, said ring portion of the first-mentioned bridge and said ring portion of said second bridge are all regular square, and an inner peripheral configuration of said outer support is regular square.

3. An acceleration sensor according to claim 1, in which said inner support, said weight, said outer support and said bridges are integrally formed of silicon.

4. An acceleration sensor according to claim 1, in which said inner connecting portions of the first-mentioned bridge and said inner connecting portions of said second bridge are away by 90° from each other about the Z axis, and said outer connecting portions of the first-mentioned bridge and said outer connecting portions of said second bridge are likewise away by 90° from each other about the Z axis.

5. An acceleration sensor according to claim 4 or 1, further comprising a third bridge and a fourth bridge, said third bridge being adapted to connect said inner support and said weight together and located away from the first-mentioned bridge in a direction of the Z axis in the space formed between said inner support and said weight, said third bridge being of the same configuration as the first-mentioned bridge, a pair of inner connecting portions of said third bridge being away by 90°0 from said pair of inner connecting portions of the first-mentioned bridge about the Z axis and a pair of outer connecting portions of said third bridge being likewise away by 90° from said pair of outer connecting portions of the first-mentioned bridge about the Z axis, said fourth bridge being adapted to connect said weight and said outer support together and located away from said second bridge in a direction of the Z axis in the space formed between said weight and said outer support, said fourth bridge being of the same configuration as said second bridge, a pair of inner connecting portions of said fourth bridge being away by 90° from said pair of inner connecting portions of said second bridge about the Z axis and a pair of outer connecting portions of said fourth bridge being likewise away by 90° from said pair of outer connecting portions of said second bridge about the Z axis.

6. An acceleration sensor according to claim 1, in which two out of said four objective parts on said weight are located on the X axis in such a manner as to be opposite to each other with the center of gravity of said weight located therebetween, and the remaining two objective parts are located on the Y axis in such a manner as to be opposite to each other with the center of gravity of said weight located therebetween.

7. An acceleration sensor according to claim 6, in which said four detection means each include a condenser of the same construction and of the same capacity, each condenser having a movable electrode formed on one of a pair of surfaces of said weight which pair of surfaces are placed opposite to each other in the direction of the Z axis, and a stationary electrode located opposite to said movable electrode.

8. An acceleration sensor according to claim 7, further comprising four second detection means, said second detection means each including a second condenser which is of the same construction and of the same capacity as the condenser of the first-mentioned detection means, said second condenser having a second movable electrode formed on the other surface of said weight and a second stationary electrode located opposite to said second movable electrode.

* * * * *